United States Patent
Spaccapietra et al.

(10) Patent No.: US 12,194,784 B2
(45) Date of Patent: Jan. 14, 2025

(54) RADIAL TIRE

(71) Applicant: The Goodyear Tire & Rubber Company, Akron, OH (US)

(72) Inventors: Ettore Passante Spaccapietra, Ettelbruck (LU); Philippe Joseph Auguste Muller, Champlon (BE); Marco Nicolò Coccon, Luxembourg (LU); Vaibhav Nawale, Boevange-sur-Attert (LU); Lionel Jean-Marie Bortolet, Longwy (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/476,888

(22) Filed: Sep. 16, 2021

(65) Prior Publication Data
US 2022/0153068 A1    May 19, 2022

Related U.S. Application Data

(60) Provisional application No. 63/115,152, filed on Nov. 18, 2020.

(51) Int. Cl.
*B60C 15/06*    (2006.01)
*B60C 13/00*    (2006.01)
*B60C 15/00*    (2006.01)

(52) U.S. Cl.
CPC .......... *B60C 15/06* (2013.01); *B60C 15/0009* (2013.01); *B60C 2015/0621* (2013.01); *B60C 2200/06* (2013.01)

(58) Field of Classification Search
CPC ............. B60C 15/024; B60C 2200/06; B60C 15/0009; B60C 13/00; B60C 13/003; B60C 15/06
See application file for complete search history.

(56) References Cited

U.S. PATENT DOCUMENTS

| | | |
|---|---|---|
| 5,205,880 A | 4/1993 | Iida et al. |
| 5,526,863 A | 6/1996 | Hodges |

(Continued)

FOREIGN PATENT DOCUMENTS

| | | |
|---|---|---|
| CN | 204123901 | 1/2014 |
| EP | 0947358 A1 | 10/1999 |

(Continued)

OTHER PUBLICATIONS

European Search Report dated May 2, 2022 for European Patent Application No. 21207496.7 which is the European counterpart to the subject patent application.

*Primary Examiner* — Cedrick S Williams
(74) *Attorney, Agent, or Firm* — Alvin T. Rockhill

(57) ABSTRACT

This invention relates to pneumatic radial tires which exhibit improved rolling resistance (provide better fuel economy) and improved performance characteristics. More particularly, this invention relates to the structure of radial ply tires for heavy load vehicles such as trucks, buses, and the like. It is based upon that finding that a defined profile of the outer surface of the sidewall portion can lead to a tire with reduced rolling resistance and a reduced generation of heat. The reduction in rolling resistance is obtained by a specific shaping of the bead portion of the tire which allows a bead mass reduction with an acceptable trade-off with regard to bead durability.

14 Claims, 2 Drawing Sheets

(56) References Cited

U.S. PATENT DOCUMENTS

| | | |
|---|---|---|
| 6,269,856 B1 | 8/2001 | Ueyoko |
| 6,401,777 B1 | 6/2002 | Verbeke-Ensch |
| 6,659,148 B1 | 12/2003 | Alie et al. |
| 8,312,903 B2 | 11/2012 | Feider et al. |
| 2010/0065179 A1 | 3/2010 | Imhoff et al. |
| 2010/0269968 A1* | 10/2010 | Kurita ................ B60C 15/024 152/454 |
| 2011/0056606 A1 | 3/2011 | Maue |
| 2011/0114239 A1 | 5/2011 | Venkataramani et al. |
| 2012/0067493 A1 | 3/2012 | Venkataramani et al. |
| 2015/0041039 A1 | 2/2015 | Dubos et al. |
| 2015/0343853 A1 | 12/2015 | Venkataramani et al. |
| 2015/0352908 A1* | 12/2015 | Osaki ................ B60C 15/0009 152/539 |
| 2017/0305206 A1 | 10/2017 | Sportelli et al. |
| 2017/0305207 A1 | 10/2017 | Sportelli et al. |
| 2021/0178822 A1 | 6/2021 | Spaccapietra et al. |
| 2021/0178823 A1 | 6/2021 | Spaccapietra et al. |

FOREIGN PATENT DOCUMENTS

| | | |
|---|---|---|
| EP | 2213484 A1 | 8/2010 |
| EP | 2808183 A1 | 12/2014 |
| EP | 2873539 A1 | 5/2015 |
| FR | 3083743 A1 | 1/2020 |
| JP | H04362406 | 12/1992 |
| JP | 2000158919 A * | 6/2000 |
| JP | 2000185530 A | 7/2000 |
| JP | 2010132068 A | 6/2010 |
| WO | 2020012121 A1 | 1/2020 |
| WO | 2020012122 A1 | 1/2020 |

\* cited by examiner

RADIAL TIRE

This application claims benefit of U.S. Provisional Patent Application Ser. No. 63/115,152, filed on Nov. 18, 2020. The teachings of U.S. Provisional Patent Application Ser. No. 63/115,152 are incorporated herein by reference in their entirety.

FIELD OF THE INVENTION

The disclosure relates to pneumatic radial tires. More particularly, the invention relates to the structure of radial ply tires for heavy load vehicles such as trucks, buses and the like.

BACKGROUND OF THE INVENTION

In heavy load tires, rubber of the tire side portion such as in the portion on the side of a bead portion tends to be deformed due to friction with a rim flange and thrusts from the rim flange. To restrict such deformations, the thickness of rubber of the tire side portion, especially its portion on the side of the bead portion, can be increased. However, thickening the rubber tends to cause more heat to be generated due to this deformation of the rubber which caused the bead portion to deteriorate faster which in turn reduces the service life of the tire.

A tire 1 of the prior art is shown in FIG. 1 and FIG. 2. This prior art tire 1 includes a pair of bead portions 3 and respective bead cores 5 embedded in each bead portion. A respective sidewall portion 7 extends radially outward from each bead portion 3 to a ground-contacting tread 9. The prior art tire 1 is reinforced by a carcass reinforcing ply 11 that toroidally extends from one of the bead portions 3 to the other one of the bead portions. A belt reinforcement package 13 is disposed between the carcass reinforcing ply 11 and the tread 9. The main portion 15 of the carcass reinforcing ply extends radially inward toward the tire rim (not shown) and is turned about each bead core 3 to form a ply turnup. The ply turnup extends at a single angle relative to a radial line tangent to the axially outermost point of the bead core 3 and parallel to the equatorial plane of the tire 1. Each ply turnup includes a radially outward end 17. A chipper 19 is disposed around the radially inward surface of the ply turnup.

From the standpoint of reducing greenhouse gas emissions, it is desirable to improve the rolling resistance of the tire produced. This can be accomplished by decreasing the overall weight of the tire which can be accomplished by reducing on rubber thickness in the sidewall portion and/or bead portions and/or by reducing the weight the internal structure of the tire, such as the carcass reinforcing ply and/or the reinforcing elements. However, any reduction in the weight of the tire should desirably be accomplished in a manner that does not compromise tire performance characteristics or service life. More specifically, the stability and/or durability of the tire should be maintained or at least an acceptable compromise should be found. It should be further noted that care should be taken to avoid heat accumulation to prevent the deterioration of the outer rubber layer through the generation of heat which also reduces fuel economy.

U.S. Pat. No. 5,526,863 describes a radial pneumatic tire having a reduced bead mass and improved rolling resistance. The bead portion has a profiled single bead filler that extends radially outward from the apex portion with an essentially constant thickness portion and a tapered portion. An outer filler strip extends from a point radially inward of the design rim flange near the bead core radially outward to a position near the mid-height of the tire when the tire is mounted on the rim. The outer filler strip may extend radially outward beyond the radial extent of the single bead filler or the single bead filler extends radially outward beyond the radial extent of the outer filler strip. The total bead mass is reduced by as much as 15% and rolling resistance is reduced by as much as 5% for the reduced bead mass tire.

EP2873539 describes a tire comprising: a tread portion contacting with a road surface; a tire side portion extended from the tread portion; a bead portion extended from the tire side portion; and a carcass portion extending through the tread portion, the tire side portion and the bead portion, wherein the carcass portion includes a main portion from the tread portion to a bead core of the bead portion through the tire side portion, and a fold back portion fold back around the bead core, a circumferential depressed portion that is depressed inward along a tire width direction and is extended along a tire circumferential direction is formed on an outer surface of the tire side portion, on a tire cross-sectional plane along the tire width direction and a tire radial direction, a rim-side outer surface that is formed in a range from a rim separation point contacting with a rim flange to an inner-side end of the circumferential depressed portion along the tire radial direction, is formed along a given circular-arc curved line having a center of a curvature radius on an inner side along the tire width direction, and on the tire cross-sectional plane, when a virtual circular-arc curved line drawn by extending the given circular-arc curved line is defined, a depth of the circumferential depressed portion with reference to the virtual circular-arc curved line is not smaller than 5 mm and not larger than 35 mm in a range of not smaller than 22% and not larger than 28% of a tire height from an bead end. This document is silent regarding the rolling resistance of the tire described therein.

EP2808183 describes a pneumatic tire with a recessed portion in the side rubber near the bead portion. The recessed portion is provided in the side rubber region from the rim separation point to the tire maximum width position. This allows to reduce the weight of the tire while, when modifying the relative position of the bead core of the bead portion and the ply main body, guaranteeing sufficient steering stability and the durability.

EP2213484 describes a pneumatic tire wherein a thin-walled recess comprised of one or more arcs having a center positioned outward from the carcass in the width-wise direction is formed in the side rubber at an outer face of at least one of the sidewall portions and the bead portion in the width-wise section of the tire. The recess is preferably defined by a single arc. This document describes an improvement in the rolling resistance of the tires described therein.

WO2020/012121 and WO2020/012122 both describe tires having a radial carcass reinforcement formed by a single layer of reinforcing element anchored in each of the beads by being turned up around a bead wire and reinforced by a stiffener. Any point on the profile of the outer surface of the sidewall, between the most axially outward point of the outer surface and a point on the outer surface which is radially outside a circle centered on the end of the turnup of the carcass reinforcement layer is at a constant distance from the main part of the tire carcass reinforcement layer. The profile of the outer surface of the sidewall described in these documents allows reducing the risk of damage when the tire comes into contact with a curb.

There is still a need for a pneumatic radial tire, for example, a structure of radial ply tire for heavy load vehicles, that shows an improved rolling resistance and at the same time good durability and/or endurance.

SUMMARY OF THE INVENTION

It has been found that a defined profile of the outer surface of the sidewall portion can lead to a tire with reduced rolling resistance and a reduced generation of heat. The reduction in rolling resistance is obtained by the disclosed shaping of the bead portion which allows a bead mass reduction with an acceptable trade-off on bead durability. In accordance with this invention radial tires with an improved rolling resistance and performance characteristics are provided. This tire comprising the profile of the outer surface of the sidewall portions being at a distance G from the carcass reinforcing ply from the most axially outward point of the said outer surface until point A, and joins the outer surface of the bead portion at the point B wherein the outer surface of the sidewall portion follows two successive curves showing the radii of curvature reversed wherein the profile of the outer surface of the sidewall portion in the portion extending from points A to B is tangent to a circle C1 centered on the ply ending, and/or the profile of the outer surface of the sidewall portion in the point B is tangent to a circle C2 centered on a radially outward chipper end; and/or the distance of the point A from the ply ending is within the range of 10 mm to 30 mm.

According to a first aspect, the present disclosure provides for a radial tire, the tire comprising a tread portion, a pair of sidewall portions, a pair of bead portions, wherein each bead portion includes a bead core, a carcass reinforcing ply including a ply turnup at each bead core, each ply turnup including a radially outward end forming a ply ending; and a chipper being disposed at each ply turnup with a radially outward chipper end that is radially below the ply ending; wherein
    reinforcing ply from the most axially outward point of the said outer surface until point A, and joins the outer surface of the bead portion at the point B wherein the outer surface of the sidewall portion follows two successive curves with a first curve extending from the point A is having a center of curvature positioned axially outward of the carcass reinforcing ply and a second curve joining the point B having a center of curvature positioned the profile of the outer surface of the sidewall portion is at a distance G from the carcass axially inward of the outer surface of the tire; wherein
    the profile of the outer surface of the sidewall portion in the portion extending from points A to B is tangent to a circle C1 centered on the ply ending and having a radius R1 ranging from 5 to 15 mm, and further wherein
    the profile of the outer surface of the sidewall portion in the point B is tangent to a circle C2 centered on the radially outward chipper end.

According to a second aspect, the disclosure provides for a radial tire, the tire comprising a tread portion, a pair of sidewall portions, a pair of bead portions, wherein each bead portion includes a bead core, a carcass reinforcing ply including a ply turnup at each bead core, each ply turnup including a radially outward end forming a ply ending; and a chipper being disposed at each ply turnup with a radially outward chipper end that is radially below the ply ending; wherein
    the profile of the outer surface of the sidewall portion is at a distance G from the carcass reinforcing ply from the most axially outward point of the said outer surface until point A, and joins the outer surface of the bead portion at the point B wherein the outer surface of the sidewall portion follows two successive curves with a first curve extending from the point A is having a center of curvature positioned axially outward of the carcass reinforcing ply and a second curve joining the point B having a center of curvature positioned axially inward of the outer surface of the tire; wherein
    the profile of the outer surface of the sidewall portion in the portion extending from points A to B is tangent to a circle C1 centered on the ply ending, and further wherein
    the distance of the point A from the ply ending is ranging from 10 to 30 mm.

According to a third aspect, the disclosure provides for a radial tire, the tire comprising a tread portion, a pair of sidewall portions, a pair of bead portions, wherein each bead portion includes a bead core, a carcass reinforcing ply including a ply turnup at each bead core, each ply turnup including a radially outward end forming a ply ending; and a chipper being disposed at each ply turnup; wherein
    the profile of the outer surface of the sidewall portion is at a distance G from the carcass reinforcing ply from the most axially outward point of the said outer surface until point A, and joins the outer surface of the bead portion at the point B wherein the outer surface of the sidewall portion follows two successive curves with a first curve extending from the point A is having a center of curvature positioned axially outward of the carcass reinforcing ply and a second curve joining the point B having a center of curvature positioned axially inward of the outer surface of the tire; wherein
    the profile of the outer surface of the sidewall portion in the portion extending from points A to B is tangent to a circle C1 centered on the ply ending, wherein
    the profile of the outer surface of the sidewall portion in the point B is tangent to a circle C2 centred on the radially outward chipper end; and further wherein
    the distance of the point A from the ply ending is ranging from 10 to 30 mm.

Without regard to the aspect considered, one or more of the following embodiments can be used to further define the radial tire of the disclosure.

For example, the radially outward chipper end is radially below the ply ending. This means that the radially outward chipper end extends over height in the sidewall portion less than the ply ending. For example, the ply ending and the radially outward chipper end are preferably separated by a distance of at least 8 mm; preferably of at least 10 mm; and more preferably, of at least 12 mm.

For example, the circle C1 centered on the ply ending has a radius R1 ranging from 5 to 15 mm. The distance between the radially outward chipper end and the outer surface of the sidewall portion expressed by the radius R1 affects the durability of the tire.

For example, the circle C2 centered on the radially outward chipper end has a radius R2 ranging from 2 to 12 mm. The distance between the radially outward chipper end and the outer surface of the bead portion expressed by the radius R2 affects the durability of the tire.

For example, the circle C1 centered on the ply ending has a radius R1 equal to or greater than the radius R2 of the circle C2 centered on the radially outward chipper end; preferably, the circle C1 centered on the ply ending has a radius R1 greater than the radius of the circle C2 centered on the radially outward chipper end.

For example, the distance of point A from the ply ending is at least 10 mm; preferably at least 15 mm. For example, the distance of the point A from the ply ending is at most 30 mm; preferably at most 25 mm. For example, the distance of point A from the ply ending is ranging from 10 to 30 mm; preferably from 15 to 25 mm.

For example, the distance of the ply ending on which is centered the circle C1 and the radially outward chipper end on which is centered the circle C2 is equal to or lower than the distance of the point A from the ply ending.

For example, the distance G is equal to or lower than the radius R1 of the circle C1 centered on the ply ending.

For example, the height of the outward ply ending is at least 35 mm with the height of the outward ply ending being determined in the radial direction and measured from the bead toe; for example, at least 38 mm; for example, at least 40 mm; for example, at least 42 mm.

For example, the chipper comprises the radially outward chipper end and an opposite chipper end, with the radially outward chipper end being axially outward the opposite chipper end with the height of the opposite chipper end is at least 25 mm; the height of the opposite chipper end is determined in the radial direction and measured from the bead toe For example, the second curve joining the point B has a radius of curvature R4 that is greater than the radius R2 of the circle C2.

For example, the radius of curvature R3 is higher than the radius of curvature R4. For example, the radius of curvature R3 is ranging from 1.2 to 5 times the radius of curvature R4; preferably, from 1.5 to 4 times.

For example, the two successive curves are arranged end to end. Alternatively, the two successive curves are separated by a flat portion. When present, the flat portion has preferably a length ranging from 0.5 to 2.0 mm; more preferably ranging from 0.8 to 1.5 mm.

For example, the second curve extends radially outwardly past the point B. For example, the second curve extends axially outwardly past the point B.

For example, the tire is a heavy load tire and/or has a nominal bead diameter of at least 22.5 inches.

For example, the tire is a commercial truck tire that includes a nominal bead diameter of at least 22.5 inches.

For example, the tire has an aspect ratio of at least 60; preferably of at least 70. For example, the tire has an aspect ratio ranging from 60 to 90, or from 70 to 90 or from 60 to 80.

Definitions

"Apex" or "bead filler apex" means an elastomeric filler located radially above the bead core and between the main portion of the carcass reinforcing ply and the ply turnup.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Axially inward" and "axially inwardly" refer to an axial direction that is toward the equatorial plane of the tire.

"Axially outward" and "axially outwardly" refer to an axial direction that is away from the equatorial plane of the tire.

"Bead" means that part of the tire comprising an annular tensile member wrapped by ply cords and shaped, with or without other reinforcement elements such as flippers, chippers, apexes, toe guards and chafers, to fit the design rim.

"Chipper" means a band of fabric or steelcord located in the bead portion with the function of reinforcing the bead portion and/or stabilizing the lower sidewall of the tire.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Gauge" refers generally to measurement and specifically to thickness.

"Ply" means a continuous layer of rubber-coated parallel cords wherein the cords are fabric or metal cords.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial tire" or "Radial-ply tire" means a belted or circumferentially-restricted pneumatic tire in which the ply cords which extend from bead to bead are laid at cord angles between about 65 to about 90 degrees with respect to the equatorial plane of the tire.

"Sidewall" or "sidewall portion" means that portion of a tire between the tread and the bead.

"Tread" means that portion of the tire that comes into contact with the road under normal inflation and load.

BRIEF DESCRIPTION OF THE DRAWINGS

Similar numeral refers to similar parts are used throughout the drawings.

DETAILED DESCRIPTION OF THE INVENTION

Figure 3:
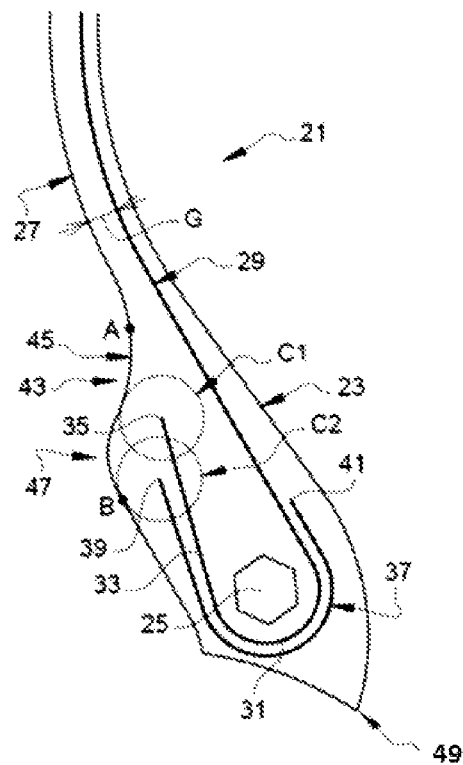
FIG. 3 is an enlarged fragmentary view of the bead portion of an exemplary embodiment of the tire of the present disclosure.

An exemplary embodiment of the radial tire of the present disclosure is shown in FIG. 3 and is indicated as reference numeral 21. The general construction of the tire is somewhat similar to that of the prior art tire 1, with the principal differences to be described in detail below. The radial tire 21 (of the subject invention) is preferably a pneumatic radial tire.

The tire 21 includes a pair of bead portions 23 (only one shown) and a respective bead core 25 embedded in each bead portion 23. The bead core 25 can comprise a wound steel wire coated with rubber or a wound of high modulus organic cord coated with rubber, such as aromatic polyamide. A respective sidewall portion 27 extends radially outward from each bead portion 23 to a ground-contacting tread (not shown). A carcass reinforcing ply 29 that preferably winds around each bead core 25. The carcass reinforcing ply 29 comprises cords preferably, steel cords and/or organic fibre cords. The organic fibre cords can be selected from polyester, rayon, nylon, aromatic polyamide and any combination thereof. A main portion 31 of the carcass reinforcing ply extends radially inward toward the tire rim (not shown) and is turned about each bead core 25 to form a ply turnup 33. The carcass reinforcing ply is also wrapped about a bead apex (not shown). In this manner, the carcass reinforcing ply envelopes the bead core 25 and at least a lower portion of the bead apex in each bead portion 23. The ply turnup 33 terminates at a radially outward end forming a ply ending 35 and may include an end cap (not shown). The carcass reinforcing ply 29 is preferably formed by a single layer of reinforcing elements.

A chipper 37 is disposed about the radially inward surface of the ply turnup 33. The chipper 37 terminates at a radially outward end 39 and may include an end cap (not shown). The radially outward chipper end 39 is axially outward from the ply ending 35 and is axially outward from an opposite chipper end 41. For example, the height of the outward ply ending 35 is at least 35 mm; for example, at least 38 mm; for example, at least 40 mm; for example, at least 42 mm. The height of the outward ply ending is determined in the radial direction and measured from the bead toe 49.

The radially outward chipper end 39 is preferably radially below the ply ending 35. In other words, the ply ending 35 extends over height in the sidewall 27 higher than the radially outward chipper end 39. The ply ending 35 and the radially outward chipper end 39 are preferably separated by a distance of at least 8 mm; preferably of at least 10 mm; and more preferably, of at least 12 mm. The ply ending 35 and the radially outward chipper end 39 are preferably separated by a distance of at most 30 mm; preferably of at most 25 mm; and more preferably, of at most 20 mm.

For example, the height of the radially outward chipper end 39 is at most 40 mm; for example, at most 35 mm; for example, at most 30 mm; for example, at most 25 mm. The height of the radially outward chipper end 39 is determined in the radial direction and measured from the bead toe 49.

It is preferred that at least one of the ply ending 35 and/or the radially outward chipper end 39 include an end cap so that the ply ending portion and the outward chipper ending portion are not parallel and are separated by a strip of rubber.

The opposite end 41 of the chipper 37 is also preferably radially below the ply ending 35. The opposite end 41 of the chipper 37 is preferably located in the bead portion 23. The opposite end 41 of the chipper 37 preferably extends over height in the bead portion 23 higher than the radially outward surface of the bead core 25. For example, the height of the opposite chipper end 41 is at least 25 mm; for example, at least 30 mm; for example, at least 35 mm; for example, at least 40 mm. For example, the height of the opposite chipper end 41 is at most 60 mm; for example, at most 55 mm; for example, at most 50 mm; for example, at most 45 mm. The height of the opposite chipper end 41 is determined in the radial direction and measured from the bead toe 49.

The profile of the outer surface 43 of the sidewall portion 27 of the tire 21 is at a distance G from the carcass reinforcing ply 29 from the most axially outward point of the said outer surface until point A and joins the outer surface of the bead portion 23 at the point B. Between the points A and B, the outer surface 43 follows two successive curves with a first curve 45 extending from the point A and having a center of curvature positioned axially outward of the carcass reinforcing ply 29; and a second curve 47 joining the point B having a center of curvature positioned axially inward of the outer surface of the tire. The outer surface of the tire includes the outer surface 43 of the sidewall portion and the outer surface of the bead portions. In a preferred embodiment, the distance G is constant. The distance G is preferably within the range of 2 mm to 10 mm, more preferably ranging from 3 mm to 7 mm. In an embodiment, the distance G is equal to or lower than the radius R1 of the circle C1 centered on the ply ending 35. The distance G is said constant when it does not vary by more than 0.5 mm. The variations in the distance are due to creep phenomena during the manufacture and curing of the tire.

In an embodiment, the distance between the ply ending 35 and the radially outward chipper end 39 is equal to or lower than the distance of the point A from the ply ending 35; i.e. the distance of the ply ending 35 and the radially outward chipper end 39 is equal to or lower than 30 mm, preferably equal or lower than 28 mm, more preferably equal or lower than 25 mm.

According to the present disclosure, the profile of the outer surface of the sidewall of the tire in the portion extending from points A to B is tangent to a circle C1 centered on the ply ending 35 and is tangent to a circle C2 centered on the radially outward chipper end 39. With preference, the portion extending from points A to B is a spline comprising two curves (45, 47) showing the radii of curvature reversed and arranged end to end or separated by a flat portion. The spline is preferably tangent to circle C2 in point B and tangent to circle C1 in a point different from point B. The spline is preferably tangent to circle C1 in a point located between points A and B. For example, when the spline comprises a flat portion, the flat portion has a length ranging from 0.5 mm to 2.0 mm; preferably ranging from 0.8 mm to 1.5 mm. For example, when the spline comprises a flat portion, the spline can be tangent to circle C1 in a point located in the flat portion arranged between the first curve 45 and the second curve 47.

The circle C1 centered on the ply ending 35 has preferably a radius R1 ranging from 5 mm to 15 mm. For example, the radius R1 of the circle C1 is at least 5 mm, or at least 7 mm, or at least 9 mm. For example, the radius R1 of the circle C1 is at most 15 mm, or at most 13 mm, or at most 11 mm.

The circle C2 centered on the radially outward chipper end 39 has preferably a radius R2 ranging from 2 mm to 12 mm. For example, the radius R2 of the circle C2 is at least 2 mm, or at least 5 mm, or at least 7 mm. For example, the radius R2 of the circle C2 is at most 12 mm, or at most 10 mm, or at most 9 mm, or at most 8 mm.

In an embodiment, the circle C1 centered on the ply ending 35 has a radius R1 equal to or greater than the radius R2 of the circle C2 centered on the radially outward chipper end 39.

It is understood that, by comparison to the prior art tire of the same size, the portion of the sidewall of the tire which shows a defined constant gauge is extended in height. As a consequence, the outer surface of the sidewall seems to present an outer cavity. This was found to lead to a tire with a reduced rolling resistance with an acceptable trade-off on bead durability due to a reasonable distance kept between the outer surface of the tire (i.e. the outer cavity) and both the ply ending 35 and the radially outward chipper end 39. Also, a reduction of heat accumulation was seen.

The shape of the outer surface of the sidewall is tangent to both the circles C1 and C2 centered on the ply ending 35 and the radially outward chipper end 39, this contributes to obtaining a smooth surface between the sidewall and the bead portion that has been shown to avoid the concentration of strain in the rubber and therefore to be favourable to the durability of the tire.

The trade-off of bead durability according to the disclosure is obtained, among others, by a distance of the point A from the ply ending 35 of at most 30 mm; preferably at most 28 mm and more preferably at most 25 mm. It is preferred that the distance of the point A from the ply ending is at least 10 mm; preferably at least 12 mm; more preferably of at least 15 mm. So that the distance of the point A from the ply ending 35 ranges from 10 mm to 30 mm; preferably ranging from 12 mm to 28 mm and more preferably from 15 mm to 25 mm. According to the disclosure, the distance of point A from the ply ending 35 is less than the distance of point A from the radially outward chipper end 39.

The first curve 45, extending from the point A, has a radius of curvature R3 that is greater than the radius R1 of the circle C1 and/or that is greater than the radius R2 of the circle C2. The second curve 47, joining the point B, is having a radius of curvature R4 that is greater than the radius R1 of the circle C1 and/or that is greater than the radius R2 of the circle C2. For example, the radius of curvature R3 is higher than the radius of curvature R4. For example, the radius of curvature R3 is ranging from 1.2 to 5 times the radius of curvature R4; preferably, from 1.5 to 4 times. As can be seen in FIG. 3, (1) the distance from the carcass reinforcing ply to the most axially outward point of the sidewall increases constantly from the sidewall portion of the tire to the inflection point; (2) the distance G from the carcass reinforcing ply to the most axially outward point of the sidewall is constant through the sidewall portion of the tire; and (3) there is only one inflection point on the outer surface of the tire situated between the sidewall portion of the tire and point B.

The apex is at least partially located in the ply turnup portion immediately adjacent to the bead core 25. The apex not only aids in mating the ply turnup 33 to main portion 31 of the carcass reinforcing ply 29 but also prevents any air pockets from being trapped in the sidewall 27 of the tire 21 during manufacturing.

The durability of the tire 21 is obtained by the combination of the internal structure of the tire 21 wherein a gap is found between the ply ending 35 and the radially outward chipper end 39, and the shape of the outer surface 43 of the sidewall portion 27 between the points A and B. Also, the smooth shape of the spline forming the outer surface 43 of the sidewall portion 27 that joins the bead portion on point B avoids a concentration of strain in the bead portion 23 and the sidewall portion 27 and facilitates the manufacture of the tire 21.

Example

A radial tire with a design according to the disclosure was produced and tested. The tire was a 315/70R22.5, wherein 315 is the nominal cross-section given in mm (metric), 70 is the aspect ratio, R is for radial and 22.5 is the nominal bead diameter (also named nominal wheel diameter) given in inches. The radius R1 of circle C1 centered on the ply ending was 9 mm. The radius R2 of circle C2 centered on the radially outward chipper end was 6 mm. The ply ending height was 42 mm. The ply ending and the radially outward chipper end were separated by a distance of 10 mm.

The rolling resistance and durability of the tire were evaluated.

The rolling resistance test was run in accordance with ISO 28580 (tire rolling on a drum of 67" dia).

Durability test: Tire mounted on a rim 9"×22.5", at 5000 kg load and 10 bar pressure, rolling on a 67" dia drum machine at 60 km/h speed.

The test values were normalized and reported in the below table:

|  | Standard | New design |
|---|---|---|
| Rolling resistance | 100 | 102 |
| Durability | 100 | 99.5 |
| Weight | 100 | 102 |

An improvement in rolling resistance (RR) performance (i.e. normalized value over 100) means lower rolling resistance. An improvement in weight performance (i.e. normalized value over 100) means a lighter tire. An improvement in durability (i.e. normalized value over 100) means higher durability.

From the results, it can be seen that the performance is rolling resistance and weight of the tire have been improved (+2) whereas no significant loss in the durability performance can be observed (−0.5). The design of the disclosure provides therefore an improved compromise between rolling resistance, durability and weight performance.

Figure 1:
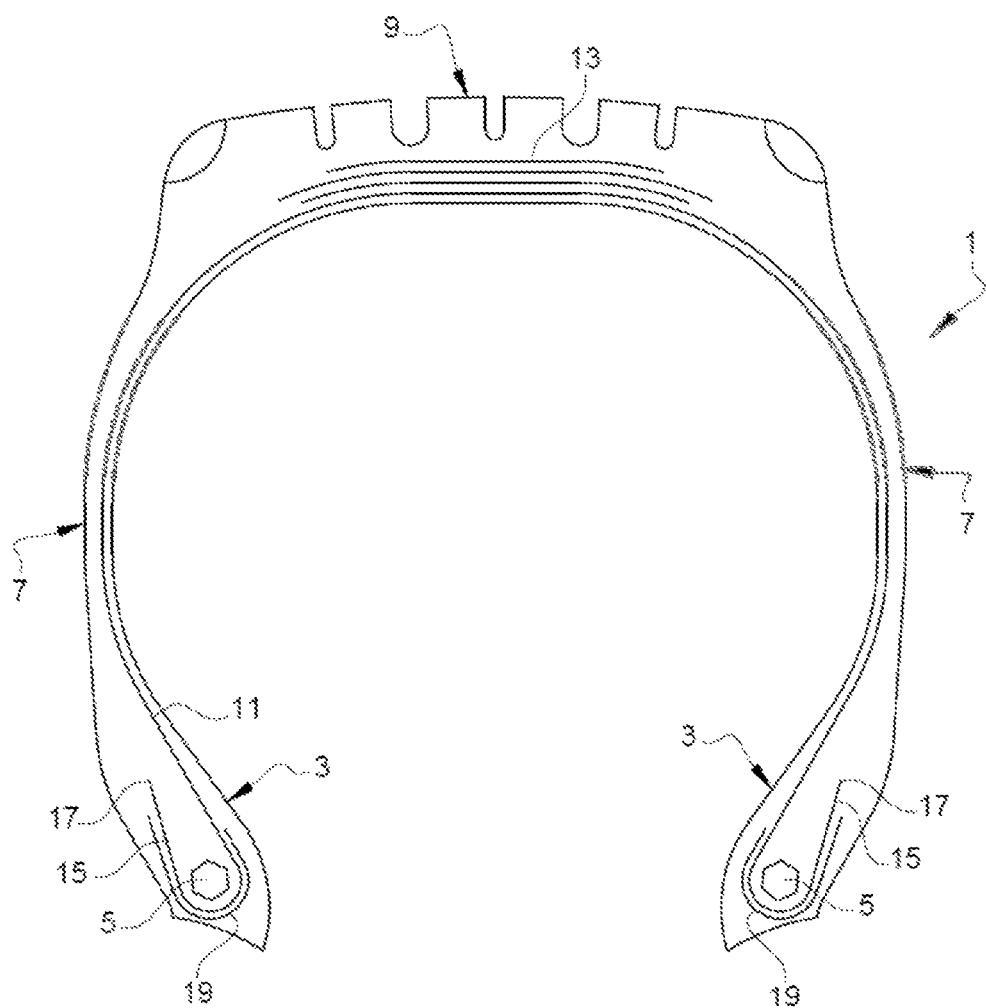
FIG. 1 is a schematic cross-sectional view of an exemplary tire of the prior art.
Figure 2:
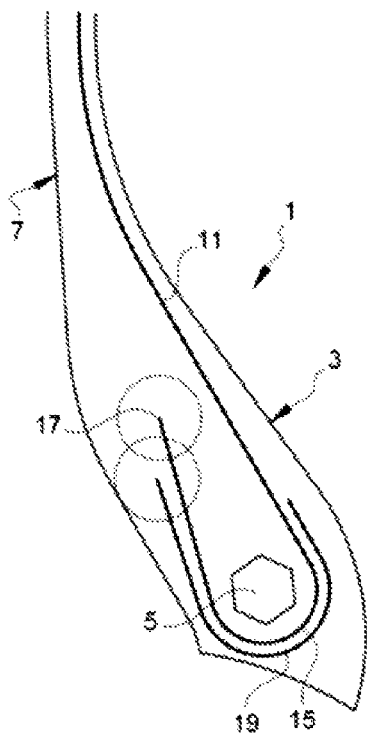
FIG. 2 is an enlarged fragmentary view of the bead portion of the tire shown in FIG. 1.

Tests on heat generation by Finite Element Analysis were performed on a tire in the same RR test conditions as ISO 28580. The temperature profile showed that a reduction of the heat generation of several degrees was obtained on the design of the disclosure by comparison to a tire comprising a design according to FIG. 2.

It is to be understood that the structure of the above-described tire 21 may be altered or rearranged, or components or steps known to those skilled in the art omitted or added, without affecting the overall concept or operation of the disclosure. For example, the teachings herein apply to a broad range of tires and may be useful in tire lines such as, but not limited to, passenger tires, radial medium truck tires, aircraft tires, and off-the-road tires, run-flat tires, and the like. It is preferred that the tire 21 be a heavy load tire. For example, the tire is a commercial truck tire that includes a nominal bead diameter of at least 22.5 inches.

For example, the tire has an aspect ratio of at least 60; preferably of at least 70. For example, the tire has an aspect ratio ranging from 60 to 90, or from 70 to 90 or from 60 to 80.

Moreover, the disclosure applies to tires formed with any type of belt structure or tread configuration.

The disclosure has been described with reference to preferred embodiments. Potential modifications and alterations will occur to others upon a reading and understanding of this description. It is to be understood that all such modifications and alterations are included in the scope of the disclosure as set forth in the appended claims, or the equivalents thereof. While certain representative embodiments and details have been shown for the purpose of illustrating the subject invention, it will be apparent to those skilled in this art that various changes and modifications can be made therein without departing from the scope of the subject invention.

What is claimed is:

1. A radial tire, the tire comprising a tread portion, a pair of sidewall portions, a pair of bead portions, wherein each bead portion includes a bead core, a carcass reinforcing ply including a ply turnup placed at each bead core, each ply turnup including a radially outward end forming a ply ending; and a chipper being disposed at each ply turnup with a radially outward chipper end that is radially below the ply ending;

wherein the profile of the outer surface of the sidewall portion is at a distance G from the carcass reinforcing ply from the most axially outward point of the said outer surface until point A, and joins the outer surface of the bead portion at the point B wherein the outer surface of the sidewall portion follows two successive curves with a first curve extending from the point A is having a center of curvature positioned axially outward of the carcass reinforcing ply and a second curve joining the point B having a center of curvature positioned axially inward of the outer surface of the tire;

wherein the profile of the outer surface of the sidewall portion in the portion extending from points A to B is tangent to a circle C1 centered on the ply ending and having a radius R1 ranging from 5 to 15 mm, wherein there is an inflection point between the first curve and the second curve on the profile of the outer surface of the sidewall portion at the point where it is tangent to circle C1, wherein circle C1 is the smallest diameter circle centered on the ply ending which extends to any point on the outer surface of the sidewall;

wherein the distance G from the carcass reinforcing ply to the most axially outward point of the sidewall is constant through the sidewall portion of the tire, and wherein there is only one inflection point on the outer surface of the tire situated between the sidewall portion of the tire and point B;

wherein the profile of the outer surface of the sidewall portion at the point B is tangent to a circle C2 centered on the radially outward chipper end; and wherein the distance G is equal to or lower than the radius R1 of the circle C1, and wherein the distance G does not vary by more than 0.5 mm.

2. The radial tire of claim 1 wherein the distance from the carcass reinforcing ply to the most axially outward point of the sidewall increases constantly from the sidewall portion of the tire to the inflection point.

3. A radial tire, the tire comprising a tread portion, a pair of sidewall portions, a pair of bead portions, wherein each bead portion includes a bead core, a carcass reinforcing ply including a ply turnup placed at each bead core, each ply turnup including a radially outward end forming a ply ending; and a chipper being disposed at each ply turnup with a radially outward chipper end that is radially below the ply ending; wherein the profile of the outer surface of the sidewall portion is at a distance G from the carcass reinforcing ply from the most axially outward point of the said outer surface until point A, and joins the outer surface of the bead portion at the point B wherein the outer surface of the sidewall portion follows two successive curves with a first curve extending from the point A is having a center of curvature positioned axially outward of the carcass reinforcing ply and a second curve joining the point B having a center of curvature positioned axially inward of the outer surface of the tire; wherein the profile of the outer surface of the sidewall portion in the portion extending from points A to B is tangent to a circle C1 centered on the ply ending and having a radius R1 ranging from 5 to 15 mm, wherein there is an inflection point between the first curve and the second curve on the profile of the outer surface of the sidewall portion at the point where it is tangent to circle C1, wherein circle C1 is the smallest diameter circle centered on the ply ending which extends to any point on the outer surface of the sidewall; and wherein the distance from the carcass reinforcing ply to the most axially outward point of the sidewall increases constantly from the sidewall portion of the tire to the inflection point; wherein the profile of the outer surface of the sidewall portion at the point B is tangent to a circle C2 centered on the radially outward chipper end, wherein the distance G is equal to or lower than the radius R1 of the circle C1, and wherein the distance G does not vary by more than 0.5 mm.

4. The radial tire of claim 3 wherein the circle C2 centered on the radially outward chipper end has a radius R2 which is within the range of 2 mm to 12 mm.

5. The radial tire of claim 3 wherein the ply ending and the radially outward chipper end are separated by a distance of at least 8 mm.

6. The radial tire of claim 3 wherein the distance of the point A from the ply ending is within the range of 10 mm to 30 mm.

7. The radial tire of claim 3 wherein the second curve joining the point B has a radius of curvature R4 that is greater than the radius R2 of the circle C2.

8. The radial tire of claim 3 wherein the two successive curves are arranged end to end.

9. The radial tire of claim 3 wherein the two successive curves are separated by a flat portion.

10. The radial tire of claim 3 wherein the chipper comprises the radially outward chipper end and an opposite chipper end, with the radially outward chipper end being axially outward the opposite chipper end with the height of the opposite chipper end is at least 25 mm; the height of the opposite chipper end is determined in the radial direction and measured from the bead toe.

11. The radial tire of claim 3 wherein the chippers include opposite ends which are disposed axially inward from the carcass reinforcing ply and which extends radially to a height which is higher than the radially outward surface of the bead cores.

12. The radial tire of claim 3 wherein the tire has a nominal bead diameter of at least 22.5 inches and an aspect ratio of at least 70.

13. The radial tire of claim 3 wherein the distance G from the carcass reinforcing ply to the most axially outward point of the sidewall is constant through the sidewall portion of the tire.

14. The radial tire of claim 3 wherein there is only one inflection point on the outer surface of the tire situated between the sidewall portion of the tire and point B.

* * * * *